(12) United States Patent
Stietz et al.

(10) Patent No.: US 12,392,372 B2
(45) Date of Patent: Aug. 19, 2025

(54) SQUEEZE FILM DAMPER AND A ROTATING MACHINERY

(71) Applicant: Miba Industrial Bearings U.S. LLC, Grafton, WI (US)

(72) Inventors: Thomas Stietz, West Bend, WI (US); Joshua Lemke, Fredonia, WI (US); Carlo Roso, Farmington, KY (US)

(73) Assignee: Miba Industrial Bearings U.S. LLC, Grafton, WI (US)

( * ) Notice: Subject to any disclaimer, the term of this patent is extended or adjusted under 35 U.S.C. 154(b) by 12 days.

(21) Appl. No.: 18/426,966

(22) Filed: Jan. 30, 2024

(65) Prior Publication Data

US 2025/0243900 A1 Jul. 31, 2025

(51) Int. Cl.
*F16C 27/04* (2006.01)

(52) U.S. Cl.
CPC ........ *F16C 27/045* (2013.01); *F16C 2360/23* (2013.01)

(58) Field of Classification Search
CPC .. F16C 27/045; F16C 2360/23; F01D 25/164; F05D 2260/96; F16F 15/0237
USPC ........................................................ 384/234
See application file for complete search history.

(56) References Cited

U.S. PATENT DOCUMENTS

| | | | | |
|---|---|---|---|---|
| 4,214,796 A | * | 7/1980 | Monzel | F16F 15/0237 415/113 |
| 4,429,923 A | | 2/1984 | White et al. | |
| 4,460,283 A | * | 7/1984 | Yoshioka | F16C 27/02 384/119 |
| 4,547,083 A | | 10/1985 | Hoerler | |
| 5,219,144 A | * | 6/1993 | Fox | F16C 27/045 248/562 |
| 5,251,985 A | * | 10/1993 | Monzel | F16C 27/045 384/99 |
| 5,316,391 A | * | 5/1994 | Monzel | F16C 27/045 384/99 |
| 5,425,584 A | * | 6/1995 | Ide | F01D 25/164 384/99 |

(Continued)

FOREIGN PATENT DOCUMENTS

JP 3126356 B2 1/2001

OTHER PUBLICATIONS

International Search Report in PCT/IB2025/050944 dated Jun. 10, 2025.

*Primary Examiner* — Henry Y Liu
(74) *Attorney, Agent, or Firm* — Collard & Roe, P.C.

(57) ABSTRACT

A squeeze film damper includes a first component configured to be rigidly coupled to a support structure of a rotating machinery; a second component extending between first and second axial ends, the first axial end facing the first component, the second component having an outer surface configured to be at least partially surrounded by a squeeze film annulus; a journal bearing coupled to the second component for pivoting a rotary shaft; a flexible spoke, wherein the flexible spoke has first and second ends, the first end being rigidly coupled to the first component; the second component including a clearance hole extending in axial direction of the second component starting from the first axial end of the second component, wherein the flexible spoke second end is rigidly coupled to the second component and the flexible spoke extends through the clearance hole.

19 Claims, 5 Drawing Sheets

(56) References Cited

U.S. PATENT DOCUMENTS

Figure 1:
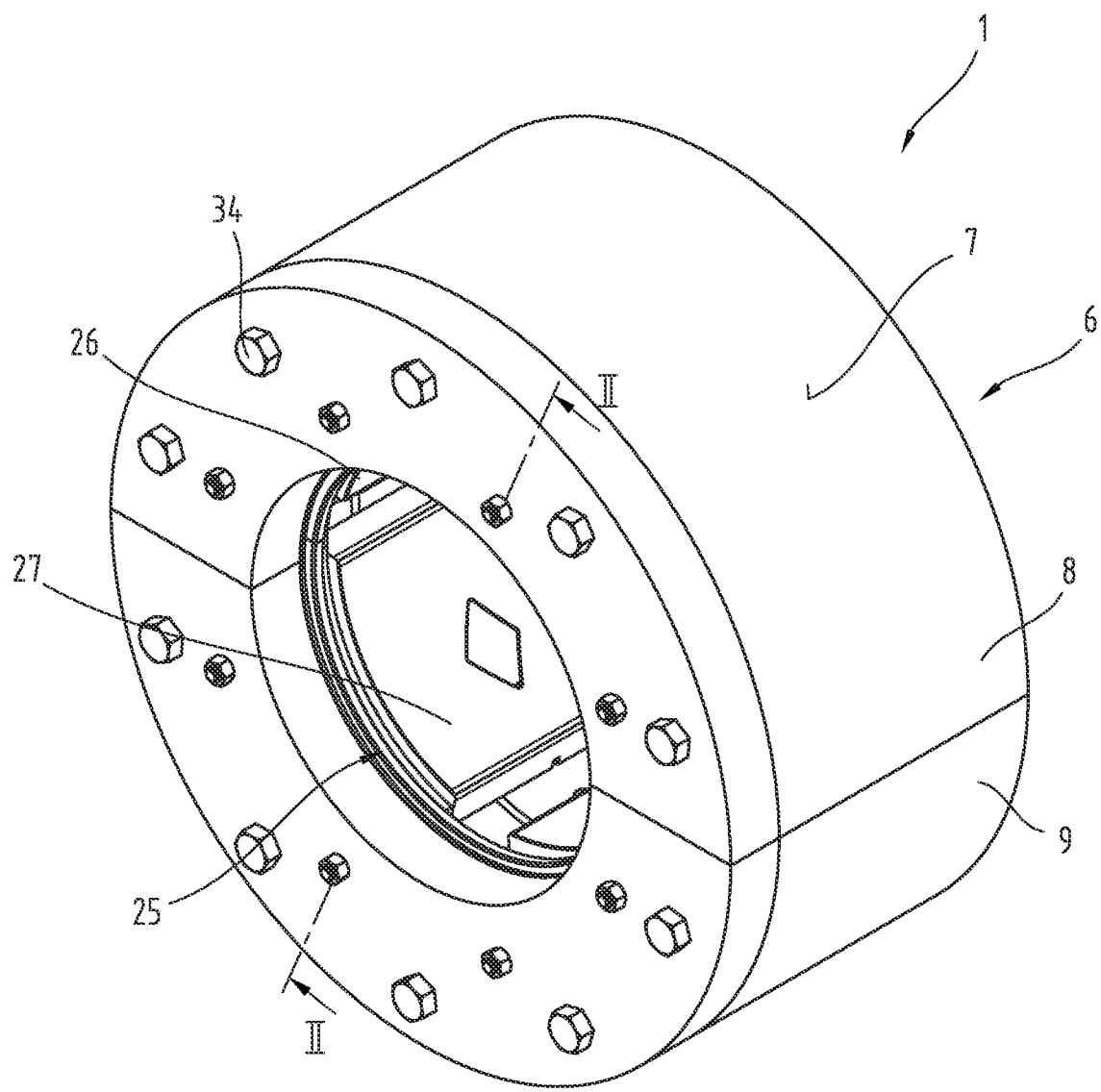

| Patent Number | Kind | Date | Inventor | Classification |
|---|---|---|---|---|
| 5,531,522 A * | | 7/1996 | Ide | F16C 17/035 384/535 |
| 5,603,574 A * | | 2/1997 | Ide | F16C 17/065 384/119 |
| 5,651,616 A | | 7/1997 | Hustak et al. | |
| 5,752,774 A * | | 5/1998 | Heshmat | F16C 27/04 384/549 |
| 6,155,720 A * | | 12/2000 | Battig | F16C 17/02 384/99 |
| 6,325,546 B1 * | | 12/2001 | Storace | F01D 25/164 384/624 |
| 6,695,478 B2 * | | 2/2004 | Bos | F01D 25/164 384/99 |
| 7,431,504 B1 * | | 10/2008 | Pelfrey | F16F 15/0237 384/535 |
| 7,625,121 B2 * | | 12/2009 | Pettinato | F16C 17/03 384/117 |
| 7,628,542 B2 * | | 12/2009 | Wada | F16F 15/0237 384/535 |
| 7,694,540 B2 * | | 4/2010 | Ishida | D06F 37/20 384/624 |
| 7,731,426 B2 * | | 6/2010 | Meacham | F16C 27/04 384/535 |
| 7,798,720 B1 * | | 9/2010 | Walsh | F04D 29/126 384/99 |
| 7,857,519 B2 * | | 12/2010 | Kostka | F16C 27/04 384/535 |
| 8,083,413 B2 * | | 12/2011 | Ertas | F16C 32/0603 384/312 |
| 8,118,570 B2 * | | 2/2012 | Meacham | F16C 32/06 417/407 |
| 8,322,038 B1 * | | 12/2012 | Heidari | F01D 25/164 29/898.07 |
| 8,342,796 B2 * | | 1/2013 | Spencer | F16C 27/045 415/113 |
| 8,408,806 B2 * | | 4/2013 | Tecza | F16C 19/542 384/405 |
| 8,496,452 B2 * | | 7/2013 | Marsal | F16C 35/067 384/906 |
| 8,545,106 B2 * | | 10/2013 | Miller | F16C 33/6659 384/473 |
| 8,573,922 B2 * | | 11/2013 | Milfs | F16C 27/045 384/624 |
| 8,632,254 B2 * | | 1/2014 | Hammond | F16C 37/00 384/441 |
| 8,662,756 B2 * | | 3/2014 | Care | F16C 27/04 384/535 |
| 8,684,602 B2 * | | 4/2014 | Care | F16C 27/04 384/1 |
| 8,726,503 B2 * | | 5/2014 | Pettinato | F16C 27/02 29/898.04 |
| 8,727,629 B2 * | | 5/2014 | Do | F16C 27/04 384/903 |
| 8,727,632 B2 * | | 5/2014 | Do | F16C 33/4623 384/534 |
| 8,734,130 B2 * | | 5/2014 | Meacham | F16C 27/045 417/407 |
| 8,834,027 B2 * | | 9/2014 | Zeidan | F16C 17/03 384/117 |
| 8,894,286 B2 * | | 11/2014 | Nicholas | F16F 15/0237 384/302 |
| 8,956,048 B2 * | | 2/2015 | Schmidt | F16C 33/58 384/99 |
| 8,984,858 B2 * | | 3/2015 | Miller | F02C 7/12 384/476 |
| 9,016,952 B2 * | | 4/2015 | Bedenk | F16C 27/045 384/562 |
| 9,039,391 B2 * | | 5/2015 | Marsal | F16C 35/067 384/906 |
| 9,856,751 B2 * | | 1/2018 | Duong | F01D 25/164 |
| 9,890,810 B2 * | | 2/2018 | Kawashita | F16F 15/0237 |
| 9,915,174 B1 * | | 3/2018 | Morris | F16F 9/02 |
| 10,077,713 B2 * | | 9/2018 | Gysling | F16C 27/045 |
| 10,233,778 B2 * | | 3/2019 | Gysling | F01D 25/164 |
| 10,458,277 B1 * | | 10/2019 | Von Berg | F16C 27/045 |
| 10,495,143 B2 * | | 12/2019 | Gysling | F16C 35/042 |
| 10,900,379 B2 * | | 1/2021 | Gysling | F16C 27/045 |
| 11,181,008 B1 * | | 11/2021 | Jonsson | F16C 19/06 |
| 11,268,441 B2 * | | 3/2022 | Gaskell | F02C 7/06 |
| 11,732,749 B2 * | | 8/2023 | Patil | F16C 17/246 384/276 |
| 11,761,486 B2 * | | 9/2023 | Prevost | F16C 33/043 384/91 |
| 11,788,577 B2 * | | 10/2023 | Larsen | F16C 25/08 384/99 |
| 2002/0067871 A1 * | | 6/2002 | Bos | F16C 27/045 384/99 |
| 2002/0076124 A1 * | | 6/2002 | Bos | F01D 25/164 384/99 |
| 2002/0136473 A1 * | | 9/2002 | Mollmann | F01D 25/164 384/99 |
| 2007/0248293 A1 * | | 10/2007 | Pettinato | F16C 27/02 384/99 |
| 2008/0292234 A1 * | | 11/2008 | Wada | F16C 27/045 384/582 |
| 2009/0110572 A1 * | | 4/2009 | Meacham | F16C 19/184 417/406 |
| 2009/0148274 A1 * | | 6/2009 | Kostka | F01D 25/164 384/535 |
| 2009/0269185 A1 * | | 10/2009 | Spencer | F16C 27/045 415/119 |
| 2009/0304313 A1 * | | 12/2009 | Ertas | F16C 32/0603 384/99 |
| 2010/0220948 A1 * | | 9/2010 | Singh | F16C 27/066 384/477 |
| 2011/0007991 A1 * | | 1/2011 | Miller | F16F 15/0237 384/474 |
| 2011/0064340 A1 * | | 3/2011 | Duong | F16C 27/045 384/535 |
| 2011/0085753 A1 * | | 4/2011 | Tecza | F16C 35/077 310/90.5 |
| 2011/0150372 A1 * | | 6/2011 | Care | F16C 27/04 384/1 |
| 2011/0150378 A1 * | | 6/2011 | Care | F16C 25/06 384/438 |
| 2011/0305567 A1 * | | 12/2011 | Milfs | F16C 27/045 29/898 |
| 2012/0121446 A1 * | | 5/2012 | Meacham | F16C 27/02 417/407 |
| 2012/0141056 A1 * | | 6/2012 | Nicholas | F16C 27/02 384/125 |
| 2013/0108202 A1 * | | 5/2013 | Do | F16C 27/045 384/572 |
| 2013/0156552 A1 * | | 6/2013 | Barlog | F16C 21/00 384/126 |
| 2013/0287327 A1 * | | 10/2013 | Hammond | F01D 5/027 384/441 |
| 2013/0315523 A1 * | | 11/2013 | Bedenk | F01D 25/164 384/456 |
| 2013/0342060 A1 * | | 12/2013 | Sibley | F16C 33/6696 310/90 |
| 2014/0072250 A1 * | | 3/2014 | Kern | F16C 19/527 384/114 |
| 2014/0185974 A1 * | | 7/2014 | Schmidt | F16C 27/04 384/535 |
| 2014/0254962 A1 * | | 9/2014 | Tecza | F16C 19/54 29/898.07 |
| 2014/0376844 A1 * | | 12/2014 | Swanson | F16C 27/02 29/898.12 |
| 2015/0078696 A1 * | | 3/2015 | Schmidt | F16C 19/184 384/504 |
| 2015/0098826 A1 * | | 4/2015 | Carter | F01D 25/164 416/174 |
| 2015/0104123 A1 * | | 4/2015 | Ertas | F16C 32/0677 384/119 |
| 2015/0104124 A1 * | | 4/2015 | Delgado Marquez | F16C 27/045 384/119 |

(56) References Cited

U.S. PATENT DOCUMENTS

| | | | | |
|---|---|---|---|---|
| 2015/0159690 A1* | 6/2015 | Regnier | ................ | F16C 19/547 384/474 |
| 2015/0267740 A1* | 9/2015 | Ryu | ........................ | F16C 17/03 384/103 |
| 2015/0300406 A1* | 10/2015 | Freeman | ................. | F16C 27/02 416/174 |
| 2015/0315932 A1* | 11/2015 | Ryu | ........................ | F01D 25/166 384/108 |
| 2015/0330452 A1* | 11/2015 | Mongeau | ............ | H02K 5/1732 310/90 |
| 2016/0138421 A1* | 5/2016 | Duong | .................... | F16C 27/04 384/581 |
| 2017/0002863 A1* | 1/2017 | Kawashita | .............. | F16C 35/02 |
| 2017/0248033 A1* | 8/2017 | Moniz | ................... | F01D 25/164 |
| 2017/0335767 A1* | 11/2017 | Gysling | .................. | F02K 3/025 |
| 2017/0350273 A1* | 12/2017 | Gysling | .................. | F16C 19/06 |
| 2019/0071997 A1* | 3/2019 | Jonsson | .................... | F02C 7/06 |
| 2019/0071998 A1* | 3/2019 | Gysling | ............. | F16F 15/0237 |
| 2020/0191017 A1* | 6/2020 | Digoude | ................... | F16C 27/045 |
| 2020/0256210 A1* | 8/2020 | Gysling | ............. | F16F 15/0275 |
| 2021/0189962 A1* | 6/2021 | Gaskell | ..................... | F02C 7/06 |
| 2021/0189971 A1* | 6/2021 | Gaskell | ..................... | F02C 7/36 |
| 2022/0120291 A1* | 4/2022 | Payyoor | ................ | F04D 29/059 |
| 2022/0243616 A1* | 8/2022 | Smedresman | .......... | F16F 1/025 |
| 2023/0258240 A1* | 8/2023 | Takeuchi | ............... | F01D 25/164 384/100 |
| 2023/0279900 A1* | 9/2023 | Takeuchi | ................ | F16C 17/03 384/312 |

\* cited by examiner

SQUEEZE FILM DAMPER AND A ROTATING MACHINERY

The invention relates to a squeeze film damper and a rotating machinery.

Squeeze film dampers are widely used in gas turbine engines to minimize rotor deflections. The damper is typically contained in a bearing compartment filled with air. A damper film is supplied by oil at an elevated pressure. The oil within the squeeze film damper provides resistance to rotor whirl as it is pushed around the damper annulus. Eventually the oil flows through the end seals of the damper into the bearing compartment where the oil is scavenged and recirculated through an engine lubrication system.

The squeeze film damper generates a force on the rotor by squeezing a film of oil between two cylindrical cross-sectional regions, the outer region fixed to supports and considered rigid, and the inner region whirling with the rotor. A pressure field is developed as the rotor whirls, resolving the net force acting on the rotor with components aligned with the eccentricity and components parallel and perpendicular to the eccentricity, which enables the forces to be expressed in terms of a squeeze film damper generated stiffness and damping constant, respectively. There is a resultant region of positive pressure with respect to the circumferential mean of the pressure within the damper, and also a region in which the pressure is reduced to below a mean pressure.

In the typical system, the mean pressure, or steady pressure, within the damper is typically set by the characteristics of the oil supply system and the leakage of the oil through the seals. As the seals approach ideal seals, i.e. no leakage, the mean pressure approaches the supply pressure. The unsteady part of the pressure, or dynamic pressure amplitude, builds with whirl amplitude. The larger the whirl, the larger the dynamic pressure amplitude becomes.

The document US2017335767A1 discloses a film damper for a gas turbine engine which includes an annular inner member and an annular outer member located radially outboard of the annular inner member, the annular outer member and the annular inner member defining a damper annulus therebetween. A fluid supply passage delivers a flow of fluid into the damper annulus from the annular outer member, and a backflow prevention device is located at the fluid supply passage to prevent backflow of the flow of fluid from the damper annulus into the fluid supply passage.

The film damper disclosed in US2017335767A1 has the disadvantage, that it has a very space consuming layout and that its function is not sufficient.

It was the objective technical problem of the present invention to overcome the shortcomings of the prior art and to provide an improved squeeze film damper and a rotating machinery that is equipped with the squeeze film damper.

The solution of the objective technical problem is achieved by a squeeze film damper and a rotating machinery according to the claims.

The invention relates to a squeeze film damper comprising:
- a first component that is configured to be coupled to a support structure;
- a second component extending between a first axial end and a second axial end, wherein the first axial end of the second component is facing the first component, wherein the second component has an outer surface that is configured to be at least partially surrounded by a squeeze film annulus;
- a journal bearing for a rotary shaft, wherein the journal bearing is coupled to the second component;
- a flexible spoke, wherein the flexible spoke has a first end and a second end, wherein the first end of the flexible spoke is coupled to the first component;
- wherein the second component comprises a clearance hole extending in axial direction of the second component starting from the first axial end of the second component,
- wherein the second end of the flexible spoke is coupled to the second component and the flexible spoke is extending through the clearance hole.

The squeeze film damper can also be termed as squeeze film damper journal bearing or as squeeze film damper journal bearing assembly.

The invention gives the advantage, that the squeeze film damper can have an improved function and at the same time is very space saving in axial direction.

In particular, the first component can be rigidly coupled to the support structure. This can for example be realized by a press-fit connection. Alternatively, or in addition the first component can be coupled to the support structure by use of fasteners.

The journal bearing can serve for rotatably supporting or for pivoting the rotary shaft.

In particular, the first end of the flexible spoke can be rigidly coupled to the first component. In one embodiment the first end of the flexible spoke can be rigidly but removable coupled to the first component. The flexible spoke can be coupled to the first component by use of a nut.

In particular, the second end of the flexible spoke can be rigidly coupled to the second component. In one embodiment, the second end of the flexible spoke can be rigidly but removable coupled to the second component. The second end of the flexible spoke can be coupled to the second component by use of a nut.

When two parts are coupled to each other, the coupling can be directly or indirectly by use of intermediate parts. Two parts can be non-detachable or detachable coupled to each other. Non-detachable means a permanent connection, for example by welding, brazing and so on.

The present invention addresses the requirement to attenuate synchronous vibration amplitudes in rotating machinery at critical resonant frequencies and at steady state rotational speeds within the intended operating speed range of the rotating machinery. This includes over-speed excursions. It also enhances the dynamic stability of the rotor-bearing and support system by introducing additional external viscous damping. The level of external viscous damping that can be added to the rotor-bearing and support system can determine the difference between acceptable performance in accordance to engineering and industry standards and an unsatisfactory dynamic vibratory behavior of the rotating machinery.

The squeeze film damper in rotating machinery applications, with the exception of most turbojet and turboshaft aircraft engines, is designed to support the journal bearing assembly in series with the journal bearing viscous damping and stiffness. Energy is dissipated within the squeeze film damper by the circular synchronous whirling and radial displacement within the squeeze film annulus between the moving second component and the stationary housing that surrounds it. The lubricant within the annulus flows in both circumferential and axial directions and generates a resistance to the journal bearing motion.

In particular, it can be provided that there is a plurality of flexible spokes. The plurality of flexible spokes can be distributed in a circular pattern on the squeeze film damper. Further, it may be provided that the second component comprises a plurality of clearance holes that can be distributed in a circular pattern on the second component. It is possible that each of the clearance holes is hosting one of the flexible spokes. This gives the advantage, that the load can be distributed over the plurality of the flexible spokes.

Furthermore, it may be useful if the second component comprises a second spoke mounting zone, wherein the second spoke mounting zone is situated at the second axial end of the second component and wherein the clearance hole is extending in axial direction of the second component starting from the first axial end of the second component to the second spoke mounting zone and wherein the second end of the flexible spoke is rigidly coupled to the second spoke mounting zone of the second component. This gives the advantage, that the first component and the second component can be mounted movable relative to each other, wherein the spoke extends throughout the majority of the length of the second component. This gives superior flexibility to the movement of the first component relative to the second component.

Furthermore, it may be provided that the journal bearing comprises at least a first journal bearing pad and a second journal bearing pad. The usage of bearing pads in combination with the bearing pads being integrated into the second component give the advantage that the possibilities for maintenance of the squeeze film damper can be improved.

Moreover, it may be provided that the first journal bearing pad is a tilting pad which is movably coupled to the second component. The surprising advantage of a tilting pad used in the squeeze film damper is that the tilting pad helps to further reduce vibration in addition to the function of the squeeze film annulus.

In addition, it may be possible that the first journal bearing pad is a tilting pad which is movably coupled to the second component and the second journal bearing pad is a fixed pad which is rigidly coupled to the second component. This combination gives the surprising advantage, that the vibration in addition to the function of the squeeze film annulus can be further reduced.

The type of tilting pad which is movably coupled to the second component can be coupled to the second element by use of flexible tilting supports. The flexible tilting supports can for example be made out of an elastomer material. It is also possible that the tilting supports are made of flexible sheet metal material.

The type of tilting pad which is rigidly coupled to the second component can be directly coupled to the second element by use of screws.

According to an advancement, it is possible that the squeeze film damper further comprises a housing, wherein the first component is rigidly coupled to the housing and wherein the housing has an inner surface, wherein the inner surface of the housing is surrounding the outer surface of the second component, wherein the squeeze film annulus is bounded by the inner surface of the housing and the outer surface of the second component. This embodiment ensures that the sealing of the squeeze film annulus can be improved such that leakage can be minimized.

According to an advancement, it is possible that the first element is coupled to the housing by use of screws.

In particular it is possible that the first element has the form of a ring element that is looking like a flange.

It is also possible that the inner surface of the housing has a lubricant distribution groove that extends in circumferential direction of the inner surface of the housing.

In an alternative embodiment it is possible that the outer surface of the second element has a lubricant distribution groove that extends in circumferential direction of the outer surface of the housing.

It is also possible that the housing comprises feed orifices to supply fluid to the squeeze film annulus and that the second element comprises feed orifices to supply fluid to the to the journal bearing. The lubricant feed orifices that supply fluid to the journal bearing can either be located within the axially positioned lubricant distribution groove or at separate convenient locations. In particular the lubricant feed orifices can be positioned in the second element and extend in radial direction of the second element.

According to a particular embodiment, it is possible that the first component has a first spoke mounting zone, wherein the first end of the flexible spoke is rigidly coupled to the first spoke mounting zone, wherein the first spoke mounting zone has a first conical inner surface and wherein the first end has a corresponding first conical outer surface. This brings the advantage, that the connection between the spoke and the first component can be improved.

Moreover, it may be provided that between the first conical outer surface and the second end of the flexible spoke a shoulder is situated, wherein the shoulder has a front surface that is facing the first component, wherein a spacer is situated between the front surface of the spoke and the first component. This gives the advantage that by use of the spacer the length of the assembly can be defined. In addition, the distance between the first component and the second component can be defined. In addition, the surface pressure in the conical surface can be defined.

An embodiment, according to which it may be provided that the flexible spoke has a bore that is extending throughout the entire length of the flexible spoke from the first end to the second end, is also advantageous. This allows tuning with respect to lateral support stiffness.

It is also possible that the second component comprises a first half shell and a second half shell, which are rigidly coupled to each other. This allows easy assembly and maintenance of the squeeze film damper.

In particular, it is possible that the first half shell and the second half shell are coupled to each other by use of screws. Further it can be provided that between the first half shell and the second half shell a sealing element is situated.

It is also possible that the first component comprises a first half part and a second half part, which are rigidly coupled to each other. This allows easy assembly and maintenance of the squeeze film damper.

In particular, it is possible that the first half part and the second half part are coupled to each other by use of screws. Further it can be provided that between the first half part and the second half part a sealing element is situated.

It is also possible that the housing comprises a first housing shell and a second housing shell, which are rigidly coupled to each other. This allows easy assembly and maintenance of the squeeze film damper.

In particular, it is possible that the first housing shell and the second housing shell are coupled to each other by use of screws. Further it can be provided that between the first housing shell and the second housing shell a sealing element is situated.

According to an advantageous advancement, it may be provided that on the first end of the flexible spoke a first threaded end is situated and on the second end of the flexible spoke a second threaded end is situated. This allows a secure connection of the flexible spoke to the first component and also to the second component.

It is also possible that the second component comprises at least one lubricant feed orifice which provides a flow connection between the squeeze film annulus and the journal bearing. Via the flow connection, the lubrication oil can flow from the squeeze film annulus to the journal bearing. This gives the advantage that the journal bearing can be supplied with sufficient lubricant.

In a further embodiment it is possible that the second component houses a first floating seal and the second component houses a second floating seal, wherein the first floating seal and the second floating seal are moveable in radial direction and wherein the first floating seal and the second floating seal are configured to seal correspond with the rotary shaft. By use of the floating seals, proper sealing to the environment can be reached.

Furthermore, it may be provided that in unloaded condition a center axis of the journal bearing is located eccentric to the outer surface of the second component. Due to this radial offset of the journal bearing it can be reached that the deflection of the flexible spoke under external load leads to a coaxial alignment of the center axis of the journal bearing relative to the outer surface of the second component.

In one embodiment the eccentric offset of the center axis of the journal bearing can be reached by placing the circular pattern of flexible spokes eccentric to the first component and centric to the second component.

In another embodiment the eccentric offset of the center axis of the journal bearing can be reached by machining the journal bearing eccentrically with respect to the second component.

In one embodiment of the invention, the second component, the journal bearing and the flexible spokes are located eccentrically with respect to the first component. This is accomplished by locating the flexible spokes eccentrically within the first component. The implementation of the built-in offset can then be precisely obtained during the manufacturing process of the squeeze film damper.

This can also be accomplished by machining the second component or the journal bearing eccentrically with respect to the first component.

Further it can be provided that in the outer surface of the second component a first seal groove and a second seal groove is situated, wherein the first seal groove houses a first seal element and the second seal groove houses a second seal element. By providing seal elements a sufficient sealing of the squeeze film annulus can be reached. The seals can be utilized to limit the axial leakage flow of the lubricant and thus also limiting potential air entrapment. The seals also increase, for a given geometry of the squeeze film damper, the viscous damping generated by the device.

In an alternative embodiment it is possible that on a first end face of the first axial end of the second component a first seal groove is situated and on a second end face of the second axial end a second seal groove is situated, wherein the first seal groove houses a first seal element and the second seal groove houses a second seal element. By providing seal elements a sufficient sealing of the squeeze film annulus can be reached. The seals can be utilized to limit the axial leakage flow of the lubricant and thus also limiting potential air entrapment. The seals also increase, for a given geometry of the squeeze film damper, the viscous damping generated by the device.

In one embodiment, the seal elements can be in form of o-rings. In an alternative embodiment, the seal elements can be in form of piston rings.

In a further embodiment, the first component can be a hollow cylindrical body. In another embodiment the second component can be a hollow cylindrical body.

Moreover, it may be provided that a first nut is applied to the first threaded end and a second nut is applied to the second threaded end, wherein the first nut and the second nut are fastened with a predetermined torque and wherein the first nut is secured to first threaded end by a first securing mechanism and the second nut is secured to second threaded end by a second securing mechanism. The securing mechanism can be a glue. The securing mechanism can be self-locking nuts. The securing mechanism can be a form fitting feature.

According to one embodiment, it is possible that the journal bearing is a sliding bearing that is oil lubricated.

According to an advancement, it is possible that the journal bearing is a hydrodynamic bearing.

A rotating machinery comprising:
a support structure;
a rotary shaft;
a squeeze film damper which pivots the rotary shaft on the support structure, wherein the squeeze film damper comprises:
a first component that is rigidly coupled to the support structure;
a second component extending between a first axial end and a second axial end, wherein the first axial end of the second component is facing the first component, wherein the second component has an outer surface that is at least partially surrounded by a squeeze film annulus;
a journal bearing for rotatably supporting the rotary shaft, wherein the journal bearing is coupled to the second component;
a flexible spoke, wherein the flexible spoke has a first end and a second end, wherein the first end of the flexible spoke is rigidly coupled to the first component;
wherein the second component comprises a clearance hole extending in axial direction of the second component starting from the first axial end of the second component,
wherein the second end of the flexible spoke is rigidly coupled to the second component and the flexible spoke is extending through the clearance hole.

In one embodiment it may be possible that the first component is rigidly coupled to the support structure and wherein the support structure has an inner surface, wherein the inner surface of the support structure is surrounding the outer surface of the second component, wherein the squeeze film annulus is bounded by the inner surface of the support structure and the outer surface of the second component.

In the embodiment of the invention, where the first component is rigidly coupled to the support structure and wherein the support structure has an inner surface, wherein the inner surface of the support structure is surrounding the outer surface of the second component, the second component and the journal bearing can be located eccentrically with respect to the support structure in unloaded condition.

In an alternative embodiment it may be possible that the squeeze film damper further comprises a housing, wherein the first component is rigidly coupled to the housing and wherein the housing has an inner surface, wherein the inner surface of the housing is surrounding the outer surface of the second component, wherein the squeeze film annulus is bounded by the inner surface of the housing and the outer surface of the second component.

The flexible spokes are elements that have an elongated extension. It is possible that the flexible spokes are rotationally symmetrical in their basic shape and have a circular cross section. In other words, the flexible spokes can be isotropic. This gives the advantage that the behavior of the flexible spokes in every position of the circular pattern of the flexible spokes is identical. This gives the advantage that by a deflection of the flexible spokes under external load, the journal bearing can move in radial direction relative to the second component without having any tilting relative to the second component. In other words, a center line of the journal bearing and a center line of the second component can stay parallel to each other, even if the journal bearing is moved in radial direction relative to the second component.

It is also possible that the flexible spokes have different diameters and shapes over their length. It is also possible that in the area of diameter changes stress relief features are situated such stress relief features can for example be radius or chamfers.

Further it can be provided that between the first element and the second element a sealing element is situated. The first element and the second element can be placed in axial distance to each other to allow radial movement of the second element relative to the first element. The sealing that is situated between the first element and the second element can be configured such to allow this relative movement.

Further it can be provided that between the first element and the housing a sealing element is situated.

It can be of advantage that the flexible spoke support system is isotropic. This gives the advantage that the damping behavior of the squeeze film damper is uniform in all radial directions.

In one embodiment it is possible that the squeeze film damper has an isotropic structure. This gives the advantage that the damping behavior of the squeeze film damper is uniform in all radial directions.

For a better understanding of the invention, it is explained in more detail with reference to the following figures.

Figure 2:
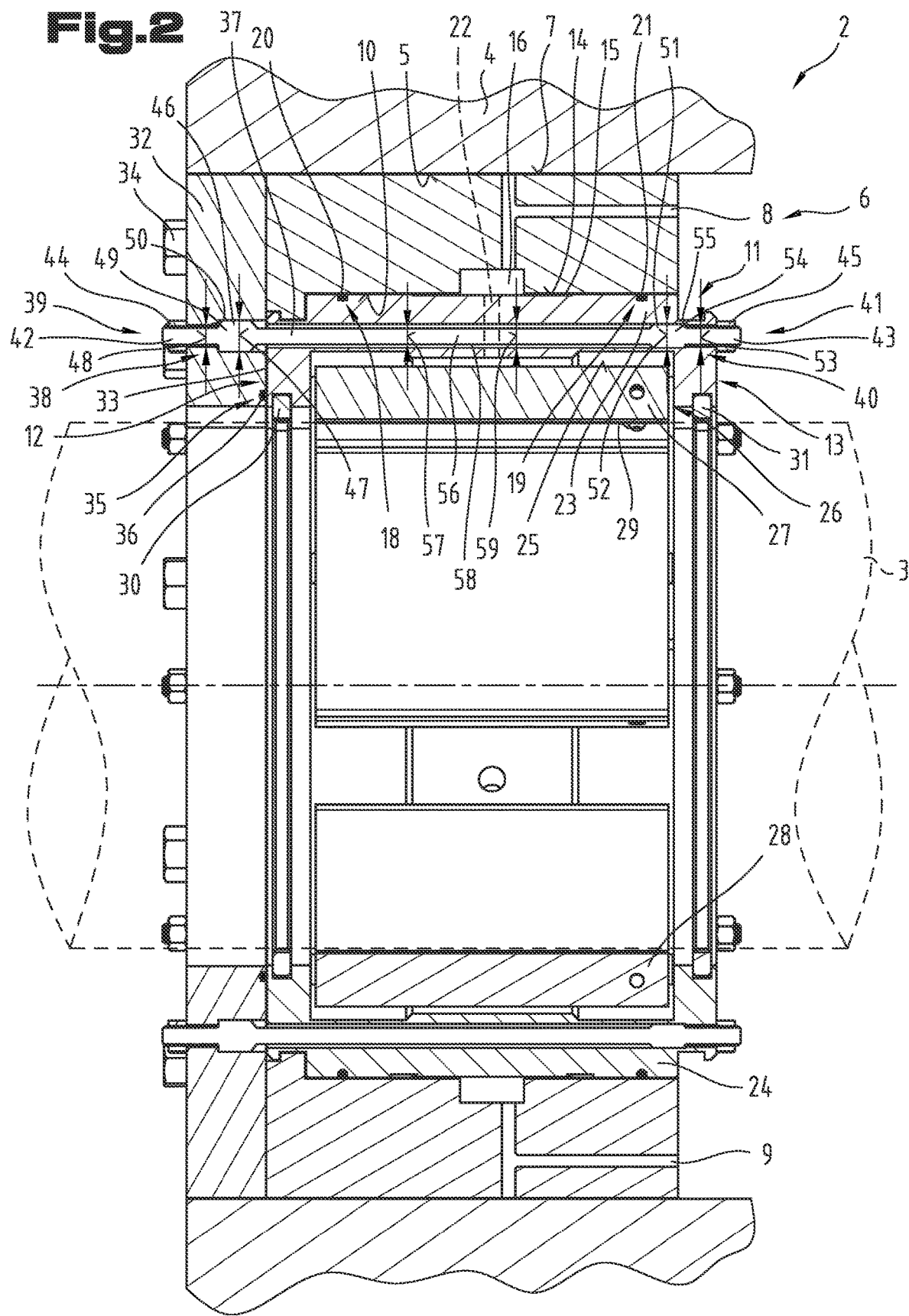
Figure 3:
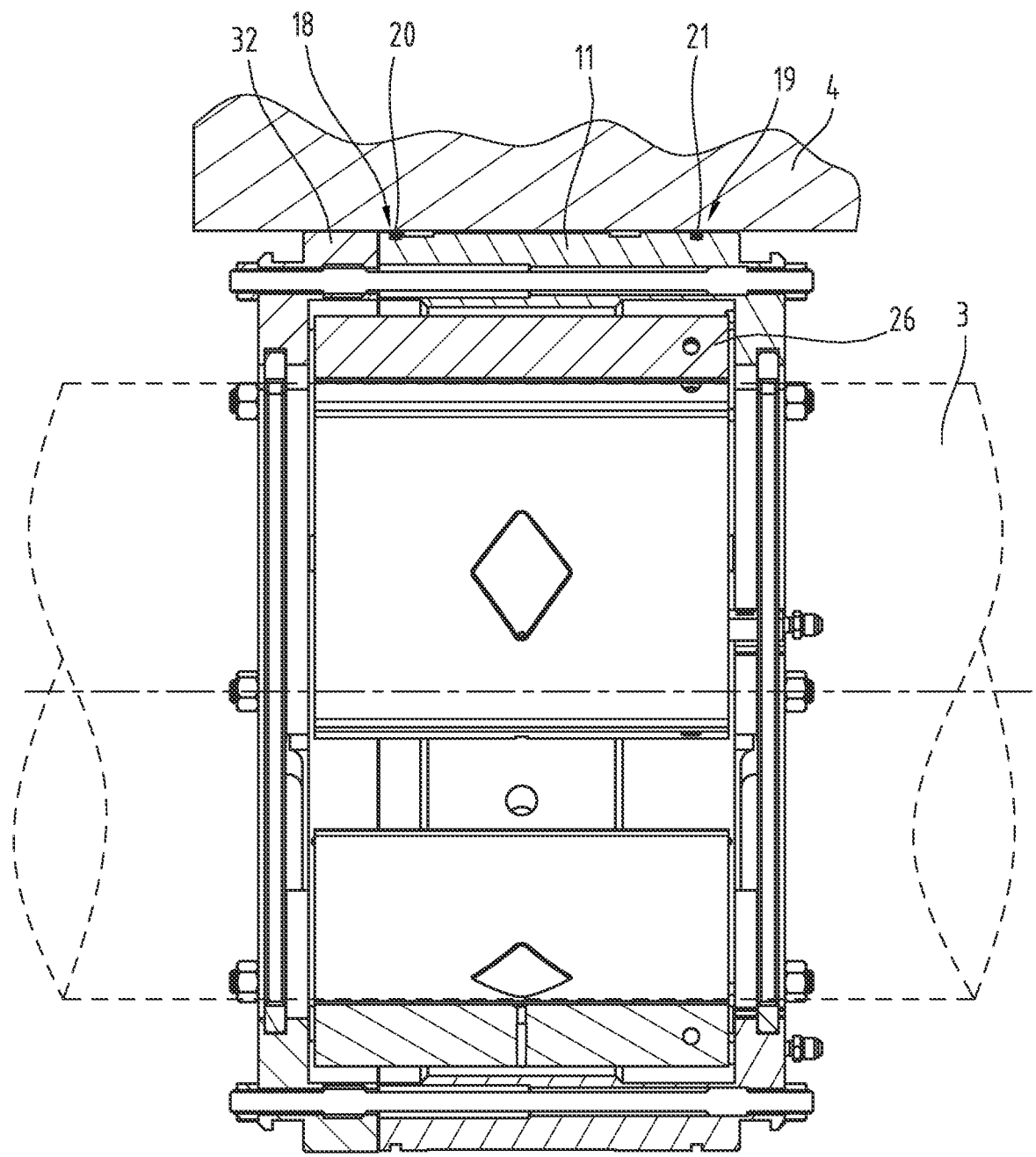
Figure 4:
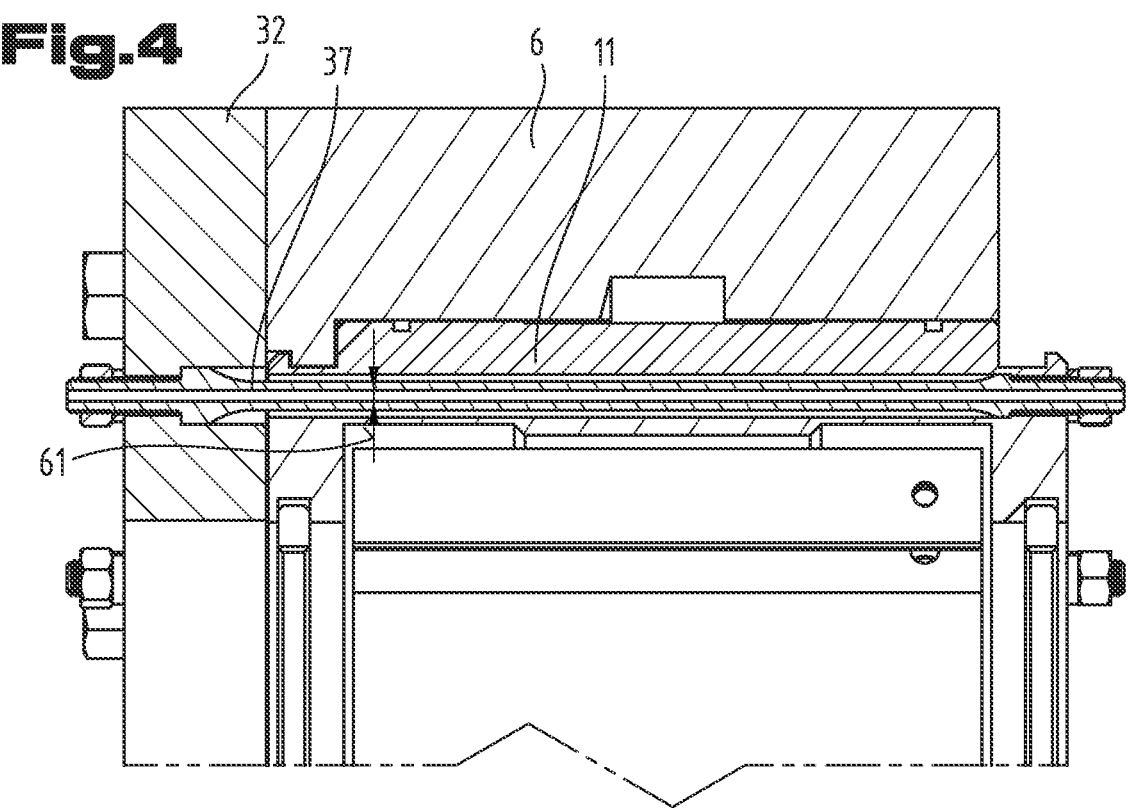
Figure 5:
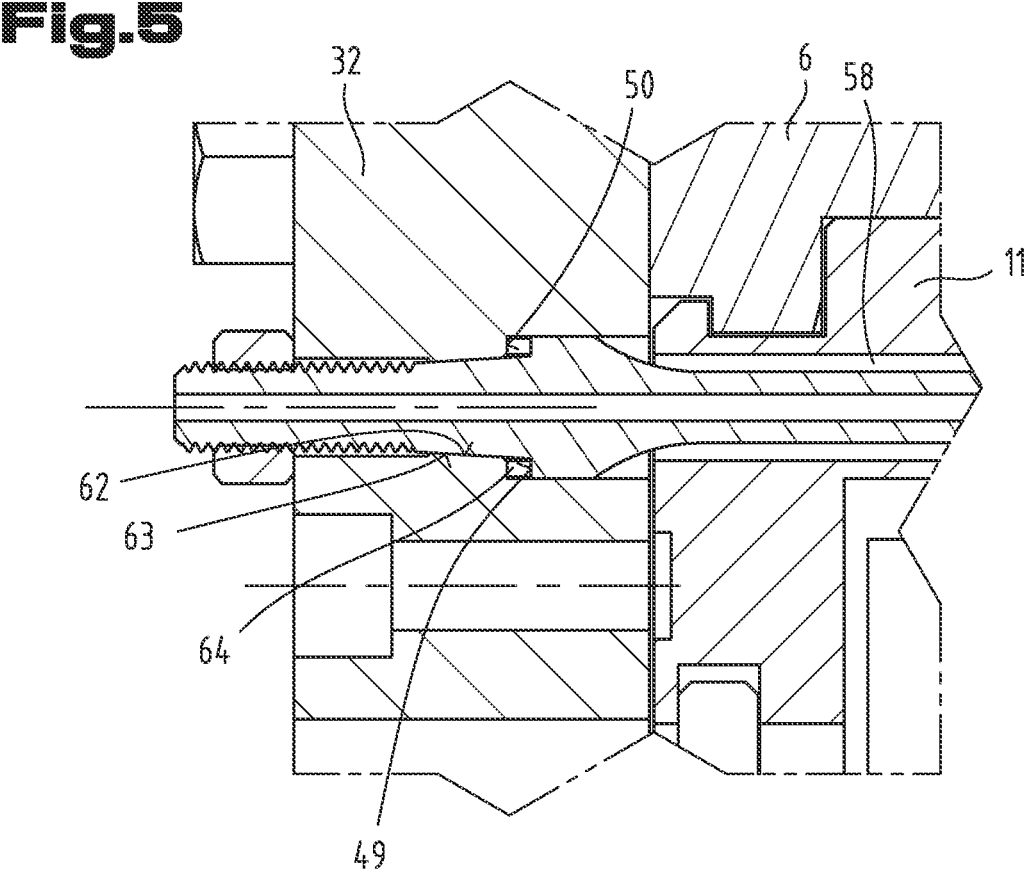
Figure 6:
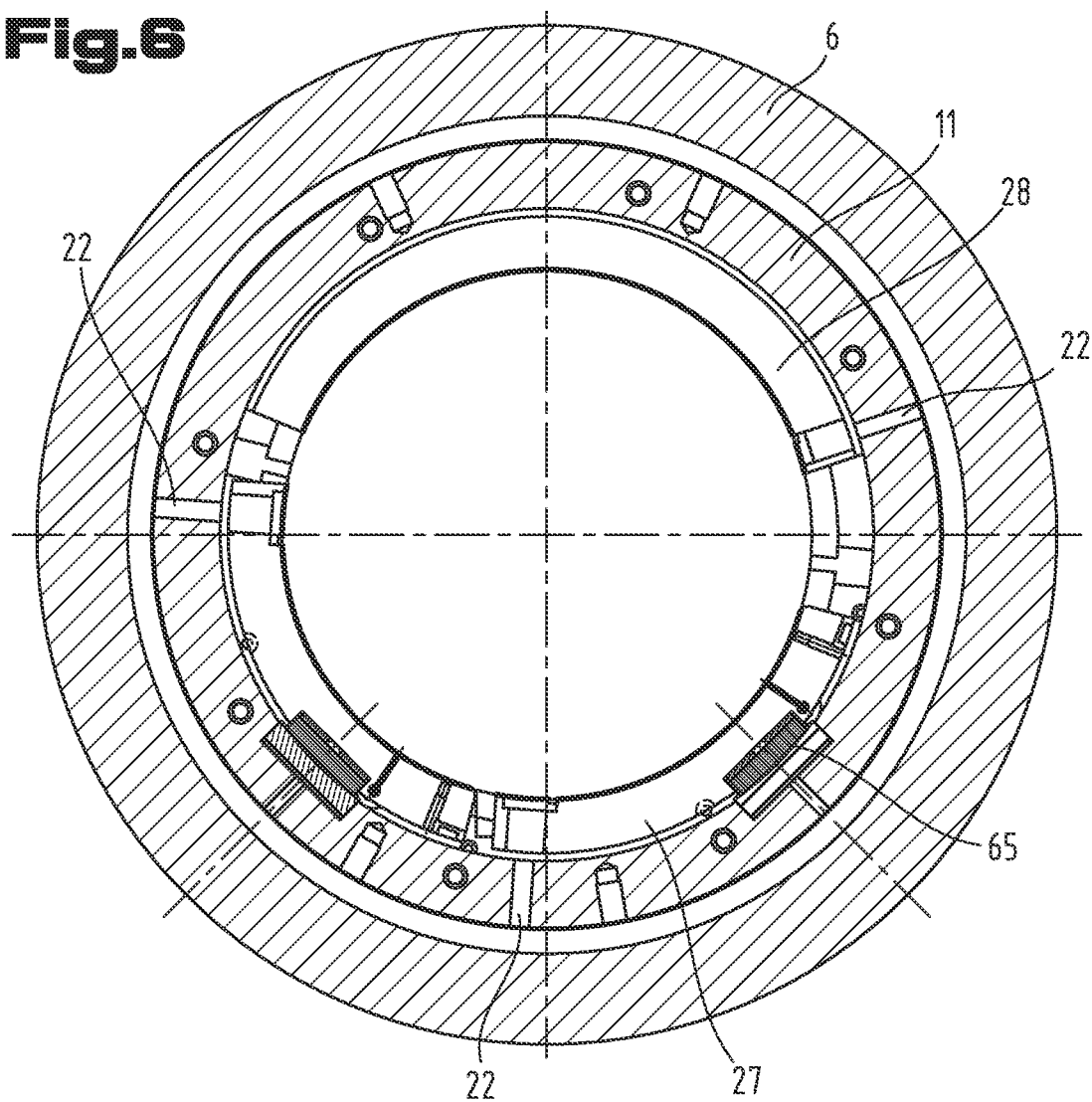
Figure 7:
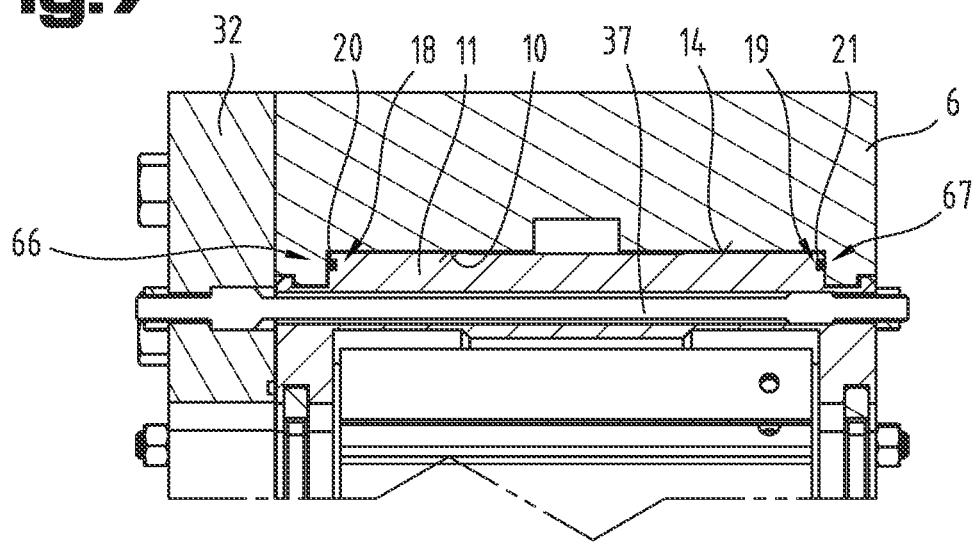

They each show a greatly simplified schematic illustration of:

FIG. 1 a perspective view of a first embodiment of a squeeze film damper;

FIG. 2 a section view of the first embodiment of the squeeze film damper which is integrated into a rotating machinery;

FIG. 3 a section view of a second embodiment of the squeeze film damper which is integrated into the rotating machinery;

FIG. 4 a section view of a third embodiment of the squeeze film damper;

FIG. 5 a section view of a fourth embodiment of the squeeze film damper;

FIG. 6 a cross section view of a fifth embodiment of the squeeze film damper;

FIG. 7 a section view of a sixth embodiment of the squeeze film damper.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows a perspective view of a first embodiment of a squeeze film damper 1 and FIG. 2 shows a section view of the first embodiment of the squeeze film damper 1 which is integrated into a rotating machinery. The first embodiment of the squeeze film damper 1 is described by reference to FIG. 1 and FIG. 2.

As it can be seen in FIG. 2, the squeeze film damper 1 can be used in a rotating machinery 2 for rotary supporting a rotary shaft 3 relative to a support structure 4 of the rotating machinery 2.

The support structure 4 can have an inner surface 5 in which the housing 6 can be accommodated. In particular, the inner surface 5 of the support structure 4 can be in contact with an outer surface 7 of the housing 6.

The housing 6 may comprise a first housing shell 8 and a second housing shell 9. The first housing shell 8 and the second housing shell 9 may be coupled to each other by use of connection elements. The connection elements can be in the form of screws. The housing 6 can be a hollow cylindrical body.

The housing 6 may have an inner surface 10 that accommodates a second component 11.

The second component 11 extends between a first axial end 12 and a second axial end 13. The second component 11 has an outer surface 14 that is partially surrounded by a squeeze film annulus 15. The squeeze film annulus 15 lies between the outer surface 14 of the second component 11 and the inner surface 10 of the housing 6.

In other words, the outer surface 14 of the second component 11 and the inner surface 10 of the housing 6 give boundary to the squeeze film annulus 15 in radial direction. During usage of the squeeze film damper 1, the squeeze film annulus 15 is filled with lubricant. Such lubricant can be oil.

As it can be seen in FIG. 2, it is possible that the inner surface 10 of the housing 6 has a lubricant distribution groove 16 that extends in circumferential direction of the inner surface 10 of the housing 6.

It is also possible that the housing 6 comprises a first feed orifice 17 to supply lubricant to the squeeze film annulus 15. The first feed orifice 17 can discharge into the squeeze film annulus 15. The first feed orifice 17 can be connected to the support structure 4.

In the outer surface 14 of the second component 11 a first seal groove 18 and a second seal groove 19 can be situated. The first seal groove 18 can house a first seal element 20 and the second seal groove 19 can house a second seal element 21.

The squeeze film annulus 15 can be bounded by the outer surface 14 of the second component 11, the inner surface 10 of the housing 6, the first seal element 20 and the second seal element 21.

As seen in FIG. 2 it is possible that the second component 11 comprises a first half shell 23 and a second half shell 24. The first half shell 23 and the second half shell 24 can be rigidly coupled to each other.

The second component 11 can provide a cavity 25 in which a journal bearing 26 can be mounted. The journal bearing 26 can comprise a first journal bearing pad 27 and a second journal bearing pad 28. In particular, the journal bearing 26 can comprise a plurality of journal bearing pads 27, 28. The journal bearing pads 27, 28 can provide a sliding surface 29 on which the rotary shaft 3 can be supported.

In particular, it is possible that the journal bearing 26 is configured to provide a hydrodynamic bearing. For providing lubricant to the journal bearing 26, it is possible that a the second component 11 comprises at least one lubricant feed orifice 22 which extends from the outer surface 14 of the second component 11 to the cavity 25 of the second component 11. In other words, the lubricant feed orifice 22 can be embedded in the second component 11 to provide a flow connection between the squeeze film annulus 15 and the journal bearing 26. The lubricant feed orifice 22 can be in form of a bore that extends in radial direction. In particular, it is possible that the lubricant feed orifice 22 is situated in the axial area of the lubricant distribution groove 16. It is also possible that a plurality of lubricant feed orifices 22 is distributed in circumferential direction on the second component 11.

Further it can be provided that the second component 11 houses a first floating seal 30 and a second floating seal 31. The first floating seal 30 and the second floating seal 31 correspond with the rotary shaft 3. The first floating seal 30 and the second floating seal 31 can be moveable in radial direction to tightly seal the rotary shaft 3.

In an embodiment that is not displayed, it is also possible that the second floating seal 31 is omitted such that the lubricant can drainage into the support structure 4.

The squeeze film damper 1 can comprise a first component 32 which can be distanced in axial direction to the second component 11. The first axial end 12 of the second component 11 can be facing the first component 32, wherein between the first component 32 and the second component 11 a gap 33 can be situated. The gap 33 provides that the first component 32 can be movable relative to the second component 11 in radial direction.

The first component 32 can be rigidly coupled to the housing 6. The first component 32 can be fixed to the housing 6 in axial direction. In particular it is possible that the first component 32 is fixed to the housing 6 by use of screws 56. In the first component 32 a plurality of through holes arranged in a circular pattern can be provided and in the housing 6 a plurality of thread holes arranged in a circular pattern can be provided, wherein the screws 56 can extend through the through holes of the first component 32 and be fixed in the thread holes of the housing 6.

It is also possible that the first component 32 comprises an axial sealing groove 35 in which an axial sealing 36 is situated. The axial sealing 36 is for sealing the gap 33 between the first component 32 and the second component 11. In an advancement the axial sealing 36 is configured such that it can stand the radial movement of the first component 32 relative to the second component 11.

As it can be seen in FIG. 2, the second component 11 can be coupled to the first component 32 by use of a flexible spoke 37. By use of the flexible spoke 37, the second component 11 and the first component 32 can be coupled to each other such that the second component 11 is radially movable relative to the first component 32.

The first component 32 can provide a first spoke mounting zone 38, wherein the first end 39 of the flexible spoke 37 can be rigidly coupled to the first spoke mounting zone 38. The second component 11 can provide a second spoke mounting zone 40, wherein the second end 41 of the flexible spoke 37 can be rigidly coupled to the second spoke mounting zone 40.

As seen in FIG. 2 it is possible that on the first end 39 of the flexible spoke 37 a first threaded end 42 is situated. It is also possible that on the second end 41 of the flexible spoke 37 a second threaded end 43 is situated.

To secure the flexible spoke 37 to the first component 32, it is possible that a first nut 44 is applied to the first threaded end 42. The first nut 44 can be secured to the first threaded end 42 by a first securing mechanism. As seen in FIG. 2, it is possible that on the flexible spoke 37 a first holding portion 46 is situated. The first holding portion 46 can have a first holding portion diameter 47. The first threaded end 42 can be immediately following the first holding portion 46. The first threaded end 42 can have a first thread diameter 48.

The first thread diameter 48 can be smaller than the first holding portion diameter 47. Because of this diameter difference a first shoulder 49 can be situated between the first threaded end 42 and the first holding portion 46. The first shoulder 49 can be situated in the area of the first end 39 of the flexible spoke 37.

The first spoke mounting zone 38 can have a first spoke mounting zone shoulder 50. The first shoulder 49 and the first spoke mounting zone shoulder 50 can be pressed to each other by a force applied of the first nut 44.

To secure the flexible spoke 37 to the second component 11, it is possible that a second nut 45 is applied to the second threaded end 43. The second nut 45 can be secured to second threaded end 43 by a second securing mechanism. As seen in FIG. 2, it is possible that on the flexible spoke 37 a second holding portion 51 is situated. The second holding portion 51 can have a second holding portion diameter 52. The second threaded end 43 can be immediately following the second holding portion 51. The second threaded end 43 can have a second thread diameter 53.

The second thread diameter 53 can be smaller than the second holding portion diameter 52. Because of this diameter difference a second shoulder 54 can be situated between the second threaded end 43 and the second holding portion 51. The second shoulder 54 can be situated in the area of the second end 41 of the flexible spoke 37.

The second spoke mounting zone 40 can have a second spoke mounting zone shoulder 55. The second shoulder 54 and the second spoke mounting zone shoulder 55 can be pressed to each other by a force applied of the second nut 45.

The flexible spoke 37 can have a middle portion 56, which can be situated between the first holding portion 46 and the second holding portion 51. The middle portion 56 can have a middle portion diameter 57. By varying the length of the middle portion 56 and by varying the middle portion diameter 57, the squeeze film damper 1 can be tuned, such that the behavior of the squeeze film damper 1 can be adapted to the actual needs.

In one embodiment it is possible that all flexible spokes 37 that are arranged in a circular pattern in the squeeze film damper 1 can be structurally identical.

In another embodiment it is possible that some of the flexible spokes 37 have a first middle portion diameter 57 some of the flexible spokes 37 have a second middle portion diameter 57, which is different to the first middle portion diameter 57. This can be used for tuning the properties of the squeeze film damper 1. In particular the flexible spokes 37 having the second middle portion diameter 57 can be uniformly distributed in the squeeze film damper 1 to provide an isotropic structure of the squeeze film damper 1.

The second component 11 can have a clearance hole 58 in which the flexible spoke 37 is situated. The clearance hole 58 can have a clearance hole diameter 59 which is smaller than the middle portion diameter 57. This ensures that the flexible spoke 37 can be elastically deformed within the clearance hole 58.

In an advancement it is possible that a plurality of flexible spokes 37 and a plurality of clearance holes 58 is arranged in a circular pattern on the second component 11.

FIG. 3 shows a further exemplary second embodiment of the squeeze film damper 1 in a sectional view, wherein, again, equal reference numbers and/or component designations are used for equal parts as before in FIGS. 1 to 2. In order to avoid unnecessary repetitions, it is pointed to/reference is made to the detailed description in FIGS. 1 through 2 preceding it.

In contrary to the first embodiment of the squeeze film damper 1, the second embodiment of the squeeze film damper 1 as shown in FIG. 3 does not comprise a housing 6. Instead, the outer surface 14 of the second component 11 is directly faced by the inner surface 5 of the support structure 4. In this case, the squeeze film annulus 15 lies between the outer surface 14 of the second component 11 and the inner surface 5 of the support structure 4.

In this second embodiment of the squeeze film damper 1, the first seal element 20 and the second seal element 21 are in direct contact with the inner surface 5 of the support structure 4.

It is also possible that the first component 32 is pressed in the inner surface 5 of the support structure 4.

FIG. 4 shows a further exemplary third embodiment of the squeeze film damper 1 in a sectional view, wherein, again, equal reference numbers and/or component designations are used for equal parts as before in FIGS. 1 to 3. In order to avoid unnecessary repetitions, it is pointed to/reference is made to the detailed description in FIGS. 1 through 3 preceding it.

As it can be seen in FIG. 4, it is possible that flexible spoke 37 has a bore 60 that is extending throughout the entire length of the flexible spoke 37 from the first end 39 to the second end 41. By varying a diameter 61 of the bore 60 in the construction phase, the properties of the flexible spoke 37 can be influenced.

FIG. 5 shows a further exemplary fourth embodiment of the squeeze film damper 1 in a sectional view, wherein, again, equal reference numbers and/or component designations are used for equal parts as before in FIGS. 1 to 4. In order to avoid unnecessary repetitions, it is pointed to/reference is made to the detailed description in FIGS. 1 through 4 preceding it.

As it can be seen in FIG. 5, it is possible that the first spoke mounting zone 38 has a first conical inner surface 62 and that the first end 39 of the flexible spoke 37 has a corresponding first conical outer surface 63. In this embodiment it is possible that a spacer 64 is situated between the first shoulder 49 and the first spoke mounting zone shoulder 50. The spacer 64 can be used for predetermining the pressure between the first conical inner surface 62 and the first conical outer surface 63. The spacer 64 can be used for predetermining the size of the gap 33 between the first component 32 and the second component 11.

FIG. 6 shows a further exemplary fifth embodiment of the squeeze film damper 1 in a cross-sectional view, wherein, again, equal reference numbers and/or component designations are used for equal parts as before in FIGS. 1 to 5. In order to avoid unnecessary repetitions, it is pointed to/reference is made to the detailed description in FIGS. 1 through 5 preceding it.

As it can be seen in FIG. 6, it is possible that the first journal bearing pad 27 is a tilting pad which is movably coupled to the second component 11 and the second journal bearing pad 28 is a fixed pad which is rigidly coupled to the second component 11.

The second journal bearing pad 28 which is a is a fixed pad can be mounted directly to the second component 11. The first journal bearing pad 27 which is a tilting pad can be mounted to the second component 11 by use of a tilting support 65. The tilting support 65 can be arranged between the first journal bearing pad 27 and the second component 11. The tilting support 65 can be a flexible structure.

FIG. 7 shows a further exemplary fourth embodiment of the squeeze film damper 1 in a sectional view, wherein, again, equal reference numbers and/or component designations are used for equal parts as before in FIGS. 1 to 6. In order to avoid unnecessary repetitions, it is pointed to/reference is made to the detailed description in FIGS. 1 through 6 preceding it.

As it can be seen in FIG. 7, it is possible that at the second component 11 the first seal groove 18 can be situated at a first end face 66 and the second seal groove 19 can be situated at a second end face 47. The first seal groove 18 can house a first seal element 20 and the second seal groove 19 can house a second seal element 21.

The first embodiment of the squeeze film damper 1 and the second embodiment of the squeeze film damper 1 can be combined with the other embodiments of the squeeze film damper 1.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS 1 squeeze film damper 29 sliding surface
2 rotating machinery 30 first floating seal
3 rotary shaft 31 second floating seal
4 support structure 32 first component
5 inner surface support structure 33 gap
6 housing 34 screw
7 outer surface housing 35 axial sealing groove
8 first housing shell 36 axial sealing
9 second housing shell 37 flexible spoke
10 inner surface housing 38 first spoke mounting zone
11 second component 39 first end
12 first axial end 40 second spoke mounting zone
13 second axial end 41 second end
14 outer surface second component 42 first threaded end
43 second threaded end
15 squeeze film annulus 44 first nut
16 lubricant distribution groove 45 second nut
17 first feed orifice 46 first holding portion
18 first seal groove 47 first holding portion diameter 19 second seal groove
20 first seal element
21 second seal element
22 lubricant feed orifice
23 first half shell
24 second half shell
25 cavity
26 journal bearing
27 first journal bearing pad
28 second journal bearing pad
48 first thread diameter
49 first shoulder
50 first spoke mounting zone shoulder
51 second holding portion
52 second holding portion diameter
53 second thread diameter
54 second shoulder
55 second spoke mounting zone shoulder
56 middle portion
57 middle portion diameter
58 clearance hole
59 clearance hole diameter
60 bore flexible spoke
61 diameter bore
62 first conical inner surface
63 first conical outer surface
64 spacer
65 tilting support
66 first end face
67 second end face

The invention claimed is:

1. A squeeze film damper (1) comprising:
a first component (32) that is configured to be coupled to a support structure (4) of a rotating machinery (2);
a second component (11) extending between a first axial end (12) and a second axial end (13), wherein the first axial end (12) of the second component (11) is facing the first component (32), wherein the second component (11) has an outer surface (14) that is configured to be at least partially surrounded by a squeeze film annulus (15);
a journal bearing (26) for a rotary shaft (3), wherein the journal bearing (26) is coupled to the second component (11);
a flexible spoke (37), wherein the flexible spoke (37) has a first end (39) and a second end (41), wherein the first end (39) of the flexible spoke (37) is coupled to the first component (32);
wherein the second component (11) comprises a clearance hole (58) extending in axial direction of the second component (11) starting from the first axial end (12) of the second component (11),
wherein the second end (41) of the flexible spoke (37) is coupled to the second component (11) and the flexible spoke (37) is extending through the clearance hole (58).

2. The squeeze film damper (1) according to claim 1, wherein the second component (11) comprises a second spoke mounting zone (40), wherein the second spoke mounting zone (40) is situated at the second axial end (13) of the second component (11) and wherein the clearance hole (58) is extending in axial direction of the second component (11) starting from the first axial end (12) of the second component (11) to the second spoke mounting zone (40) and wherein the second end (41) of the flexible spoke (37) is coupled to the second spoke mounting zone (40) of the second component (11).

3. The squeeze film damper (1) according to claim 1, wherein the journal bearing (26) comprises at least a first journal bearing pad (27) and a second journal bearing pad (28).

4. The squeeze film damper (1) according to claim 3, wherein the first journal bearing pad (27) is a tilting pad which is movably coupled to the second component (11).

5. The squeeze film damper (1) according to claim 4, wherein the first journal bearing pad (27) is a tilting pad which is movably coupled to the second component (11) and the second journal bearing pad (28) is a fixed pad which is rigidly coupled to the second component (11).

6. The squeeze film damper (1) according to claim 1, further comprising a housing (6), wherein the first component (32) is rigidly coupled to the housing (6) and wherein the housing (6) has an inner surface (10), wherein the inner surface (10) of the housing (6) is surrounding the outer surface (14) of the second component (11), wherein the squeeze film annulus (15) is bounded by the inner surface (10) of the housing (6) and the outer surface (14) of the second component (11).

7. The squeeze film damper (1) according to claim 6, wherein the inner surface (10) of the housing (6) has a lubricant distribution groove (16) that extends in circumferential direction of the inner surface (10) of the housing (6).

8. The squeeze film damper (1) according to claim 1, wherein the first component (32) has a first spoke mounting zone (38), wherein the first end (39) of the flexible spoke (37) is coupled to the first spoke mounting zone (38),
wherein the first spoke mounting zone (38) has a first conical inner surface (62) and
wherein the first end (39) has a corresponding first conical outer surface (63).

9. The squeeze film damper (1) according to claim 8, wherein between the first conical outer surface (63) and the second end (41) of the flexible spoke (37) a first shoulder (49) is situated, wherein the first shoulder (49) is facing the first component (32), wherein a spacer (64) is situated between the first shoulder (49) and the first component (32).

10. The squeeze film damper (1) according to claim 1, wherein the second component (11) comprises a first half shell (23) and a second half shell (24), which are rigidly coupled to each other.

11. The squeeze film damper (1) according to claim 1, wherein on the first end (39) of the flexible spoke (37) a first threaded end (42) is situated and on the second end (41) of the flexible spoke (37) a second threaded end (43) is situated.

12. The squeeze film damper (1) according to claim 11, wherein a first nut (44) is applied to the first threaded end (42) and a second nut (45) is applied to the second threaded end (43), wherein the first nut (44) and the second nut (45) are fastened with a predetermined torque and wherein the first nut (44) is secured to first threaded end (42) by a first securing mechanism and the second nut (45) is secured to second threaded end (43) by a second securing mechanism.

13. The squeeze film damper (1) according to claim 1, wherein the second component (11) comprises at least one lubricant feed orifice (22) which provides a flow connection between the squeeze film annulus (15) and the journal bearing (26).

14. The squeeze film damper (1) according to claim 1, wherein the second component (11) houses a first floating seal (30) and a second floating seal (31), wherein the first floating seal (30) and the second floating seal (31) are configured to correspond with the rotary shaft (3).

15. The squeeze film damper (1) according to claim 1, wherein in unloaded condition a center axis of the journal bearing (26) is located eccentric to the outer surface (14) of the second component (11).

16. The squeeze film damper (1) according to claim 1, wherein in the outer surface (14) of the second component (11) a first seal groove (18) and a second seal groove (19) is situated, wherein the first seal groove (18) houses a first seal element (20) and the second seal groove (19) houses a second seal element (21).

17. The squeeze film damper (1) according to claim 1, wherein the flexible spoke (37) support system is isotropic.

18. A rotating machinery (2) comprising:
- a support structure (4);
- a rotary shaft (3);
- a squeeze film damper (1) which the rotary shaft (3) on the support structure (4), wherein the squeeze film damper (1) comprises:
- a first component (32) that is coupled to the support structure (4);
- a second component (11) extending between a first axial end (12) and a second axial end (13), wherein the first axial end (12) of the second component (11) is facing the first component (32), wherein the second component (11) has an outer surface (14) that is at least partially surrounded by a squeeze film annulus (15);
- a journal bearing (26) for rotatably supporting the rotary shaft (3), wherein the journal bearing (26) is coupled to the second component (11);
- a flexible spoke (37), wherein the flexible spoke (37) has a first end (39) and a second end (41), wherein the first end (39) of the flexible spoke (37) is coupled to the first component (32);

wherein the second component (11) comprises a clearance hole (58) extending in axial direction of the second component (11) starting from the first axial end (12) of the second component (11), wherein the second end (41) of the flexible spoke (37) is coupled to the second component (11) and the flexible spoke (37) is extending through the clearance hole (58).

19. The rotating machinery (2) according to claim 18, wherein the first component (32) is rigidly coupled to the support structure (4) and wherein the support structure (4) has an inner surface (5), wherein the inner surface (5) of the support structure (4) is surrounding the outer surface (14) of the second component (11), wherein the squeeze film annulus (15) is bounded by the inner surface (5) of the support structure (4) and the outer surface (14) of the second component (11).

* * * * *